US 8,832,759 B2

(12) United States Patent
Ji et al.

(10) Patent No.: US 8,832,759 B2
(45) Date of Patent: Sep. 9, 2014

(54) RESOURCE SCHEDULING APPARATUS AND METHOD, PROGRAM REQUESTING METHOD AND SYSTEM

(75) Inventors: Xiangyang Ji, Shenzhen (CN); Yongxiong Liao, Shenzhen (CN); Wei Luo, Shenzhen (CN); Zengli Jia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1015 days.

(21) Appl. No.: 12/893,305

(22) Filed: Sep. 29, 2010

(65) Prior Publication Data
US 2011/0023061 A1    Jan. 27, 2011

Related U.S. Application Data

(63) Continuation of application No. PCT/CN2009/070980, filed on Mar. 24, 2009.

(30) Foreign Application Priority Data

Mar. 31, 2008  (CN) .......................... 2008 1 0103135

(51) Int. Cl.
  H04N 7/173       (2011.01)
  H04N 21/472      (2011.01)
  H04N 21/238      (2011.01)
  H04N 7/16        (2011.01)
  H04N 21/2385     (2011.01)

(52) U.S. Cl.
  CPC ......... H04N 7/165 (2013.01); H04N 21/47202 (2013.01); H04N 21/23805 (2013.01); H04N 21/2385 (2013.01)
  USPC ................... 725/95; 725/86; 725/87; 725/93; 725/94; 725/96; 725/100; 725/103; 370/468

(58) Field of Classification Search
  USPC ................... 725/86–87, 91, 93–100; 370/468
  See application file for complete search history.

(56) References Cited

U.S. PATENT DOCUMENTS

2005/0125832 A1*  6/2005  Jost et al. .................... 725/95
2005/0289618 A1*  12/2005  Hardin ....................... 725/95
(Continued)

FOREIGN PATENT DOCUMENTS

CN        101022538 A       8/2007
CN        101116301 A       1/2008
(Continued)

OTHER PUBLICATIONS

International Search Report mailed Jul. 9, 2009 in corresponding International Patent Application PCT/CN2009/070980.

(Continued)

Primary Examiner — Jun Fei Zhong
(74) Attorney, Agent, or Firm — Staas & Halsey LLP

(57) ABSTRACT

A resource scheduling apparatus, a resource scheduling method, a program requesting method, a program requesting system, and a Set Top Box (STB) are provided. The resource scheduling method includes: distributing bandwidth greater than an inherent code rate of a program respectively requested by a user to a Video On Demand (VOD) program of the user within available bandwidth of a frequency point according to a received VOD user request; and reducing the bandwidth distributed to at least one VOD program to which bandwidth has been distributed according to the received VOD user request for currently requesting the program when the available bandwidth of the frequency point is smaller than an inherent code rate of a currently requested program, so that the available bandwidth of the frequency point is greater than or equal to the inherent code rate of the currently requested program. Thus, a transmission speed of the program and a utilization ratio of the bandwidth are increased.

22 Claims, 10 Drawing Sheets

| Bandwidth distributed to user / Demanding time | 1 | 2 | 3 | 4 | 5 | 6 | 7 | 8 | 9 | 10 | 11 |
|---|---|---|---|---|---|---|---|---|---|---|---|
| 18:00:00 | 15 | | | | | | | | | | |
| 18:00:02 | 15 | 15 | | | | | | | | | |
| 18:00:04 | 15 | 15 | 3.75 | | | | | | | | |
| 18:00:06 | 15 | 15 | 3.75 | 3.75 | | | | | | | |
| 18:00:08 | 15-3.75 | 15 | 3.75 | 3.75 | 3.75 | | | | | | |
| 18:00:10 | 15-3.75*2 | 15 | 3.75 | 3.75 | 3.75 | 3.75 | | | | | |
| 18:00:12 | 15-3.75*3 | 15 | 3.75 | 3.75 | 3.75 | 3.75 | 3.75 | | | | |
| 18:00:14 | 3.75 | 15-3.75 | 3.75 | 3.75 | 3.75 | 3.75 | 3.75 | 3.75 | | | |
| 18:00:16 | 3.75 | 15-3.75*2 | 3.75 | 3.75 | 3.75 | 3.75 | 3.75 | 3.75 | 3.75 | | |
| 18:00:18 | 3.75 | 15-3.75*3 | 3.75 | 3.75 | 3.75 | 3.75 | 3.75 | 3.75 | 3.75 | 3.75 | |
| 18:00:20 | 3.75*1/4 | 3.75 | 3.75 | 3.75 | 3.75 | 3.75 | 3.75 | 3.75 | 3.75 | 3.75 | 3.75*3/4 |

(56) References Cited

U.S. PATENT DOCUMENTS

| | | |
|---|---|---|
| 2007/0104222 A1 | 5/2007 | Luss |
| 2007/0288662 A1 | 12/2007 | Chen |
| 2009/0313667 A1 | 12/2009 | Zhao et al. |
| 2010/0278280 A1 | 11/2010 | Yu et al. |
| 2011/0072475 A1* | 3/2011 | McKiel, Jr. ............... 725/100 |
| 2011/0197239 A1* | 8/2011 | Schlack ............... 725/95 |
| 2011/0296475 A1* | 12/2011 | Craner ............... 725/90 |

FOREIGN PATENT DOCUMENTS

| | | |
|---|---|---|
| CN | 101272479 A | 9/2008 |
| CN | 101365103 A | 2/2009 |
| CN | 101272479 | 11/2011 |
| CN | 101272479 B | 11/2011 |
| WO | 00/60864 | 10/2000 |
| WO | 03/081872 A1 | 10/2003 |

OTHER PUBLICATIONS

International Search Report, mailed Jul. 9, 2009, in corresponding International Application PCT/CN2009/070980 (5 pp.).
Chinese Office Action issued Oct. 23, 2009 in corresponding Chinese Patent Application No. 200810103135.5 (4 pages) (3 pages English Translation).
Written Opinion of the International Searching Authority mailed Jul. 9, 2009 issued in corresponding International Patent Application No. PCT/CN2009/070980.

* cited by examiner

| Demanding time | Bandwidth distributed to first user | Bandwidth distributed to second user | Bandwidth distributed to third user | Total bandwidth consumed by system |
|---|---|---|---|---|
| 18:00 | 3.75*10=37.5 | | | 37.5 |
| 18:05 | 3.75*9=37.5 | 3.75*1=3.75 | | 37.5 |
| 18:10 | 3.75*8=37.5 | 3.75*1=3.75 | 3.75*1=3.75 | 37.5 |

FIG. 4

| Demanding time | Bandwidth distributed to first user | Bandwidth distributed to second user | Bandwidth distributed to third user | Bandwidth distributed to fourth user | Bandwidth distributed to fifth user | Total bandwidth consumed by system |
|---|---|---|---|---|---|---|
| 18:00 | 3.75*4=15 | | | | | 15M |
| 18:05 | 3.75*4=15 | 3.75*4=15 | | | | 30M |
| 18:10 | 3.75*4=15 | 3.75*4=15 | 3.75*1=3.75 | | | 33.75M |
| 18:15 | 3.75*4=15 | 3.75*4=15 | 3.75*1=3.75 | 3.75*1=3.75 | | 37.5M |
| 18:20 | 3.75*3=11.25 | 3.75*4=15 | 3.75*1=3.75 | 3.75*1=3.75 | 3.75*1=3.75 | 37.5M |

FIG. 5

| Demanding time | Bandwidth distributed to first user | Bandwidth distributed to second user | Bandwidth distributed to third user | Bandwidth distributed to fourth user | Bandwidth distributed to fifth user | Total bandwidth consumed by system |
|---|---|---|---|---|---|---|
| 18:00 | 3.75*4=15 | | | | | 15M |
| 18:05 | 3.75*4=15 | 3.75*4=15 | | | | 30M |
| 18:10 | 3.75*4=15 | 3.75*4=15 | 3.75*1=3.75 | | | 33.75M |
| 18:15 | 3.75*4=15 | 3.75*4=15 | 3.75*1=3.75 | 3.75*1=3.75 | | 37.5M |
| 18:20 | 18.75 | 3.75*4=15 | 3.75*1=3.75 | 0 | 3.75*1=3.75 | 37.5M |

FIG. 6

| Demanding time | Bandwidth distributed to first user | Bandwidth distributed to second user | Bandwidth distributed to third user | Bandwidth distributed to fourth user | Bandwidth distributed to fifth user | Total bandwidth consumed by system |
|---|---|---|---|---|---|---|
| 18:00 | 3.75*4=15 | | | | | 15M |
| 18:05 | 3.75*4=15 | 3.75*4=15 | | | | 30M |
| 18:10 | 3.75*4=15 | 3.75*4=15 | 3.75*1=3.75 | | | 33.75M |
| 18:15 | 3.75*4=15 | 3.75*4=15 | 3.75*1=3.75 | 3.75*1=3.75 | | 37.5M |
| 18:20 | 0 | 3.75*4=15 | 3.75*4=15 | 3.75*1=3.75 | 3.75*1=3.75 | 37.5M |

FIG. 7

| Bandwidth distributed to user / Demanding time | 1 | 2 | 3 | 4 | 5 | 6 | 7 | 8 | 9 | 10 | 11 |
|---|---|---|---|---|---|---|---|---|---|---|---|
| 18:00:00 | 15 | | | | | | | | | | |
| 18:00:02 | 15 | 15 | | | | | | | | | |
| 18:00:04 | 15 | 15 | 3.75 | | | | | | | | |
| 18:00:06 | 15 | 15 | 3.75 | 3.75 | | | | | | | |
| 18:00:08 | 15-3.75 | 15 | 3.75 | 3.75 | 3.75 | | | | | | |
| 18:00:10 | 15-3.75*2 | 15 | 3.75 | 3.75 | 3.75 | 3.75 | | | | | |
| 18:00:12 | 15-3.75*3 | 15 | 3.75 | 3.75 | 3.75 | 3.75 | 3.75 | | | | |
| 18:00:14 | 3.75 | 15-3.75 | 3.75 | 3.75 | 3.75 | 3.75 | 3.75 | 3.75 | | | |
| 18:00:16 | 3.75 | 15-3.75*2 | 3.75 | 3.75 | 3.75 | 3.75 | 3.75 | 3.75 | 3.75 | | |
| 18:00:18 | 3.75 | 15-3.75*3 | 3.75 | 3.75 | 3.75 | 3.75 | 3.75 | 3.75 | 3.75 | 3.75 | |
| 18:00:20 | 3.75*1/4 | 3.75 | 3.75 | 3.75 | 3.75 | 3.75 | 3.75 | 3.75 | 3.75 | 3.75 | 3.75*3/4 |

RESOURCE SCHEDULING APPARATUS AND METHOD, PROGRAM REQUESTING METHOD AND SYSTEM

CROSS-REFERENCE TO RELATED APPLICATIONS

This application is a continuation of International Application No. PCT/CN2009/070980, filed on Mar. 24, 2009, which claims priority to Chinese Patent Application No. 200810103135.5, filed on Mar. 31, 2008, both of which are hereby incorporated by reference in their entireties.

FIELD OF THE INVENTION

The present invention relates to the field of mobile communications, and more particularly to a resource scheduling apparatus and a resource scheduling method, and a program requesting method and a program requesting system.

BACKGROUND OF THE INVENTION

In a digital television bi-directional service, a user may use the Video On Demand (VoD) service. A structure of a cable digital television system is as shown in FIG. 1, and the process of requesting a program in the system is described in the following: A user visits an Electronic Program Guide (EPG) server 1 by using a Set Top Box (STB) 5, browses an EPG, and selects a program. Middleware 2 controls a VOD server 3 according to VOD information to output a code stream of the program at an inherent code rate of the code stream of the program, and sends program description information such as a transmission frequency point of the code stream and a Service-ID to the STB 5. An Internet Protocol (IP) Quadrature Amplitude Modulator (IPQAM) 4 multiplexes and outputs the received code stream of the program. The STB 5 decodes and plays the corresponding program or audio and video stream according to the received program description information.

The IPQAM is a device configured to perform up-conversion on the code stream, in which the IPQAM receives a Transport Steam (hereafter referred to as a TS stream) input from an IP port, multiplexes the TS stream, and then outputs a Radio Frequency (RF) signal to the STB, so that the code stream is transmitted in a Hybrid Fiber Coax (HFC) network.

In the VOD service, the IPQAM receives the code stream of the program from a corresponding port, then multiplexes the code stream, converts the code stream into an RF signal, and outputs the RF signal. The cable digital system serves each user individually, so that the IPQAM receives the code stream from one port, converts the code stream into the RF, and outputs the RF for only one user every time. A bandwidth provided by one frequency point is fixed and the bandwidth is represented by Q, for example, currently the bandwidth widely used in China is 38 M. The inherent code rates of the programs are the same and represented by X, so that the number of the programs that can be transmitted by one frequency point is Q/X.

The capability of outputting the code stream of the VOD server also serves one user individually. For example, the VOD server may output 1000 streams at the same time, and may serve 1000 users at the same time. When the VOD server serves the 1000 users, if excess users request the service, the VOD server cannot satisfy the excess requests.

In conclusion, within the period of playing the program, the user monopolizes resources of the IPQAM and the VOD server. Therefore, when many users request a program at the same time, a head-end system needs to provide the same number of code streams as the users requesting the program at the same time. In addition, the larger the number of the users requesting the program is, the larger the number of the streams output by the system is required, and therefore the system requires higher performance. As a result, costs are high. The head-end system is a system on an operator side. Referring to the structure shown in FIG. 1, the head-end system includes an EPG server, a VOD server, an IPQAM, and middleware.

Because most of the users watch the television programs in a concentrated period, for example, between 19:00 and 20:00, the number of the users that watch the program in other time periods is small. Therefore, if other time periods are utilized without greatly increasing the costs, the costs of the entire system are reduced.

During the procedure for implementing the present invention, the inventors find that the prior art has at least the following problems as follows: In the concentrated time periods of watching the television programs by the users, the number of the code streams of the program to be output by the system is large, and therefore the burden is heavy, so that the system requires higher performance, and therefore the system costs are high. On the other hand, in the dispersed time periods of watching the television programs by the users, the frequency point resource is seriously wasted due to idle states.

SUMMARY OF THE INVENTION

The embodiments of the present invention are directed to a resource scheduling apparatus and a resource scheduling method, and a program requesting method and a program requesting system, so as to overcome the following drawbacks in the prior art: period of occupying resources by a user is the same as a program duration, which results in higher performance requirements for the system and further high system costs, and serious resource waste resulting from dispersed time periods of watching programs by users.

In an embodiment, the present invention provides a resource scheduling method. The method includes the following steps:

Within available bandwidth of a frequency point, bandwidth is distributed to a Video On Demand (VOD) program of the user according to a received VOD user request, wherein the bandwidth is greater than bandwidth that is occupied by an inherent code rate of a VOD program requested by a user.

The bandwidth distributed to at least one VOD program to which bandwidth has been distributed is reduced according to the received VOD user request for currently requesting the VOD program when the available bandwidth of the frequency point is smaller than the bandwidth that is occupied by an inherent code rate of a currently requested VOD program, so that the available bandwidth of the frequency point is greater than or equal to the inherent code rate of the currently requested VOD program.

The present invention is directed to a resource scheduling apparatus, so as to overcome the drawback in the prior art that the period of occupying resources by a user is the same as a program duration, which results in that a system requires higher performance, and costs are high, and overcome the drawback that dispersed time periods of watching programs by users results in serious resource waste.

In an embodiment, the present invention provides a resource scheduling apparatus. The apparatus includes a bandwidth distribution module and a bandwidth adjustment module.

The bandwidth distribution module is configured to distribute bandwidth to a VOD program according to a received VOD user request, wherein the bandwidth is greater than a bandwidth that is occupied by an inherent code rate of a VOD program and within available bandwidth of a frequency point.

The bandwidth adjustment module is configured to reduce, according to the received VOD user request for currently requesting the VOD program, bandwidth distributed to at least one VOD program to which bandwidth has been distributed when the available bandwidth of the frequency point is smaller than the bandwidth that is occupied by an inherent code rate of a currently requested VOD program, so that the available bandwidth of the frequency point is greater than or equal to the inherent code rate of the currently requested VOD program.

In the resource scheduling apparatus and the resource scheduling method according to the present invention, program data is transmitted by distributing the bandwidth greater than the inherent code rate of the program to the VOD program of the user, thereby enhancing a transmission speed of the program, and enhancing a utilization ratio of the bandwidth.

The present invention is directed to a program requesting system, so as to overcome the drawback in the prior art that the period of occupying resources by a user is the same as a program duration, which results in that a system requires higher performance, and costs are high, and overcome the drawback that dispersed time periods of watching programs by users results in serious resource waste.

The present invention is directed to a program requesting method, so as to overcome the drawback in the prior art that the period of occupying resources by a user is the same as a program duration, which results in that a system requires higher performance, and costs are high, and overcome the drawback that dispersed time periods of watching programs by users results in serious resource waste.

In an embodiment, the present invention provides a program requesting method. The method includes the following steps.

An Electronic Program Guide (EPG) is visited by using a decoding terminal, a program is selected, and VOD information is sent.

Middleware schedules a code stream corresponding to a program according to the received VOD information, and sends program description information to the decoding terminal. The process of scheduling the code stream includes the following steps:

A bandwidth is distributed to a VOD program according to a received VOD user request, wherein the bandwidth is greater than a bandwidth that is occupied by an inherent code rate of a VOD program and within available bandwidth of a frequency point.

The bandwidth distributed to at least one VOD program to which bandwidth has been distributed is reduced, according to the received VOD user request for currently requesting the VOD program when the available bandwidth of the frequency point is smaller than the bandwidth that is occupied by an inherent code rate of a currently requested VOD program, so that the available bandwidth of the frequency point is greater than or equal to the inherent code rate of the currently requested VOD program.

A modulator multiplexes and outputs the code stream corresponding to the requested program.

The decoding terminal decodes and stores the code stream corresponding to the program according to the acquired program description information.

In an embodiment, the present invention provides a program requesting system. The system includes an EPG server, middleware, a bandwidth distribution module, and a bandwidth adjustment module.

The EPG server is configured to provide EPG information, receive information of a selected program, and send VOD information.

The middleware is connected to the EPG server and configured to schedule a code stream corresponding to the program according to the received VOD information, and send program description information of the program to a decoding terminal.

The bandwidth distribution module is configured to distribute bandwidth to a Video On Demand (VOD) program according to a received VOD user request, wherein the bandwidth is greater than a bandwidth that is occupied by an inherent code rate of a VOD program and within available bandwidth of a frequency point.

The bandwidth adjustment module is configured to reduce, according to the received VOD user request for currently requesting the VOD program, bandwidth distributed to at least one VOD program to which bandwidth has been distributed when the available bandwidth of the frequency point is smaller than the bandwidth that is occupied by an inherent code rate of a currently requested VOD program, so that the available bandwidth of the frequency point is greater than or equal to the inherent code rate of the currently requested VOD program.

In the program requesting system, the program requesting system, and a Set Top Box (STB) according to the present invention, frequency point resources are reasonably distributed according to the received VOD request, and the received program data is stored in a storage module that is by disposed. In this way, the number of users requesting the same program and the transmission speed of the VOD program data are increased. Therefore, pressure of the system is relieved and the utilization ratio of the resource is increased.

BRIEF DESCRIPTION OF THE DRAWINGS

FIG. 4 is a block diagram of a resource scheduling method according to another embodiment of the present invention;

FIG. 5 is a block diagram of a resource scheduling method according to another embodiment of the present invention;

FIG. 6 is a block diagram of a resource scheduling method according to another embodiment of the present invention;

FIG. 7 is a block diagram of a resource scheduling method according to another embodiment of the present invention;

DETAILED DESCRIPTION OF THE EMBODIMENTS

Figure 1:
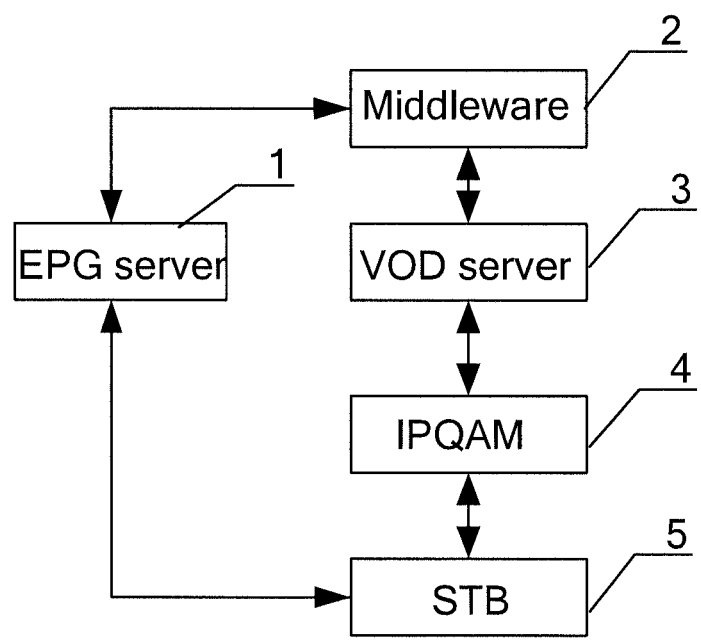
FIG. 1 is a schematic structural view of a conventional cable digital television system.
Figure 2:
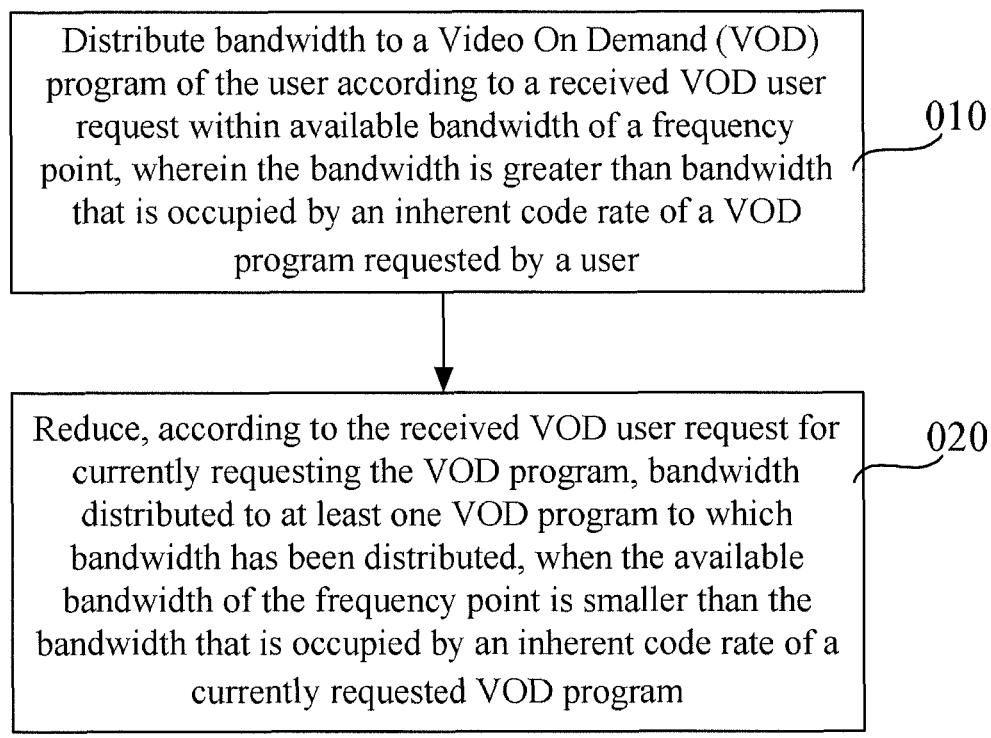
FIG. 2 is a flow chart of a resource scheduling method according to an embodiment of the present invention.

FIG. 2 is a flow chart of a resource scheduling method according to an embodiment of the present invention. The method includes the following steps:

In step 010, bandwidth is distributed to a Video On Demand (VOD) program of the user according to a received VOD user request within available bandwidth of a frequency point, wherein the bandwidth is greater than bandwidth that is occupied by an inherent code rate of a VOD program requested by a user.

In this embodiment, the VOD request of the user may be sent through an Internet Protocol (IP) channel, a telephone, or a short message. A head-end system selects a frequency point having the idlest resource from the available frequency points of the user according to the VOD request of the user, and then distributes one bandwidth greater than the inherent code rate of the program requested by the user to the VOD program of the user. For example, when the inherent code rate of the program is 3.75 Mbps, bandwidth of 4.0 M is distributed to the user, and the head-end system controls the output code stream to be 4.0 Mbps.

In step 020, the bandwidth distributed to at least one VOD program to which bandwidth has been distributed is reduced according to the received VOD user request for currently requesting the program when the available bandwidth of the frequency point is smaller than the bandwidth that is occupied by an inherent code rate of a currently requested program, so that the available bandwidth of the frequency point is greater than or equal to the inherent code rate of the currently requested program.

In this embodiment, as the number of the users requesting the program is increased, a residual bandwidth of the available frequency point is smaller than the inherent code rate of the currently requested program, which means that the residual bandwidth of the available code rate is unable to transmit program data of the currently requested program. In such case, the bandwidth of the VOD program that is transmitting needs to be adjusted, that is, the bandwidth that is distributed to the VOD program to which bandwidth has been distributed and that is greater than the inherent code rate of the VOD program is reduced, so that the available bandwidth of the frequency point is greater than or equal to the inherent code rate of the program currently requested by the user.

In the present invention, the bandwidth greater than the inherent code rate of the program is distributed to the VOD program of the user and the VOD program data is transmitted at a speed greater than the inherent code rate of the program, so that transmission time is saved, a burden of a system is relieved, and a utilization ratio of the bandwidth is increased compared with a case that the VOD program data is transmitted at a speed equal to the inherent code rate of the program in the prior art.

Figure 3:
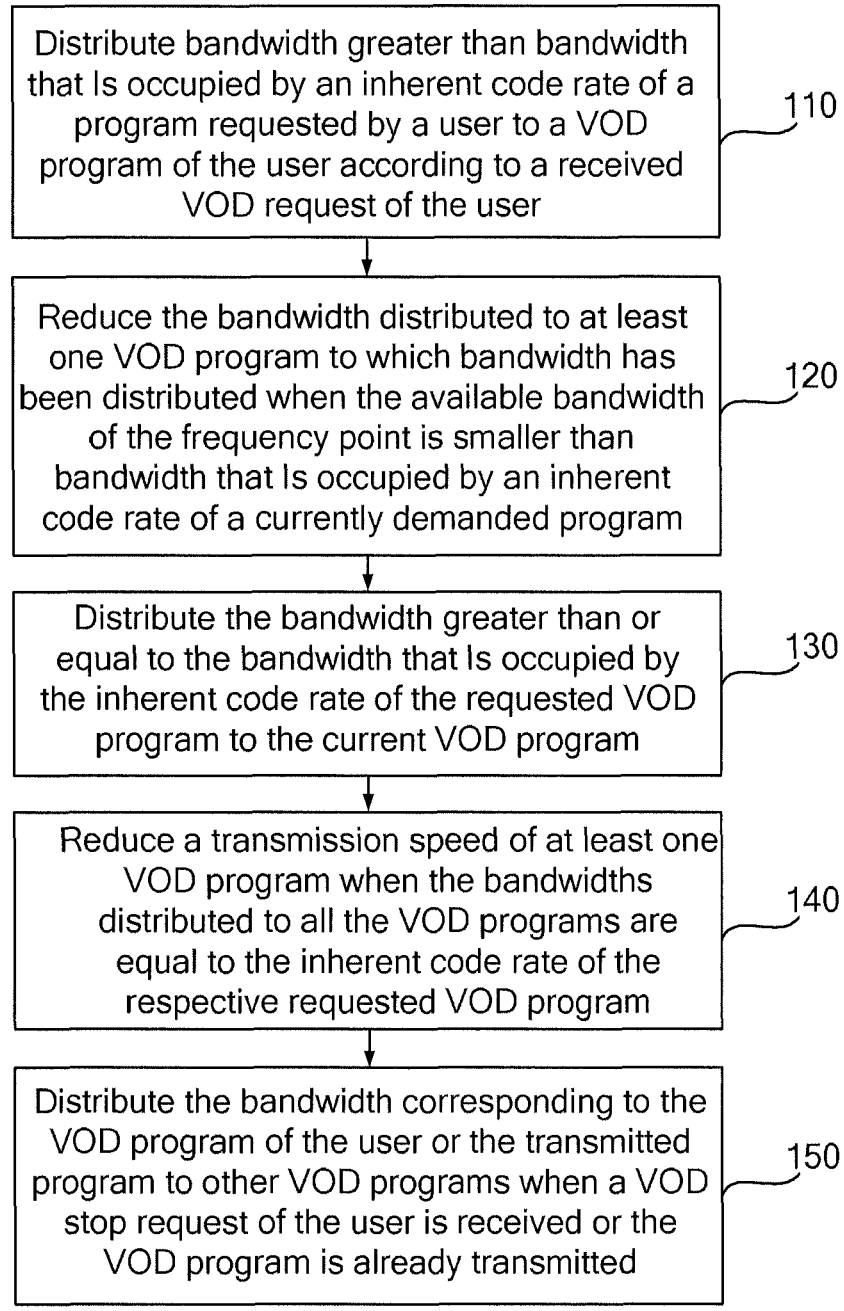
FIG. 3 is a flow chart of a resource scheduling method according to another embodiment of the present invention.

FIG. 3 is a flow chart of a resource scheduling method according to another embodiment of the present invention, which includes the following steps:

In step 110, bandwidth is distributed to a VOD program of the user according to a received VOD user request, where the bandwidth is greater than bandwidth that is occupied by an inherent code rate of a program respectively requested by a user and within available bandwidth of a frequency point.

In this embodiment, the VOD request of the user is sent through an IP channel, a telephone, or a short message. A head-end system selects a frequency point having the idlest resource from the available frequency points of the VOD program of a user a according to the VOD request of the user, for example, the user a requests a program b having an inherent code rate m, and then distributes one bandwidth greater than m to the VOD program.

In this embodiment, before step 110, the method further includes acquiring reference information for distributing the bandwidth to each VOD program and distributing the bandwidth to the VOD program of the user according to the reference information and the VOD request. The reference information at least includes Set Top Box (STB) processing capability information. The STB processing capability information is a speed Y of storing received program data. The head-end system determines a maximum speed of transmitting the VOD program data according to $v \leq (Y+C)$, in which C indicates an inherent code rate of the requested program, and v indicates a maximum speed of transmitting the program data of the VOD.

In step 120, the bandwidth that is distributed to at least one VOD program to which bandwidth has been distributed and that is greater than the inherent code rate of the VOD program is reduced according to the received VOD request of the user when the available bandwidth of the frequency point is smaller than the inherent code rate of the currently requested program, so that the available bandwidth of the frequency point is greater than or equal to the inherent code rate of the currently requested program.

In this embodiment, as the number of the users requesting the program is increased, a residual bandwidth of the available frequency point is smaller than the inherent code rate of the currently requested program, which means that the residual bandwidth of the available code rate is unable to transmit program data of the currently requested program. The bandwidth of the VOD program that is transmitting needs to be adjusted, that is, the bandwidth distributed to the VOD program to which bandwidth has been distributed is reduced, so that the available bandwidth of the frequency point is greater than or equal to the inherent code rate of the currently requested program. For the VOD program having the reduced bandwidth, preferably, the reduced bandwidth is still greater than the inherent code rate of the program requested by the user.

In step 130, the bandwidth greater than or equal to the bandwidth that is occupied by the inherent code rate of the requested program is distributed to the current VOD program.

In step 140, when the bandwidth distributed to all the VOD programs are equal to the inherent code rate of the respective requested program, a transmission speed of at least one VOD program transmitting the VOD program data is reduced.

The bandwidth of the VOD is reduced according to a formula $R_1T_1+R_2T_2 \ldots +R_nT_n+XT_x \geq CT_c$. $R_1$ indicates a transmission speed corresponding to bandwidth distributed to the VOD program for a first time. $T_1$ indicates a transmission time corresponding to the transmission speed. $R_n$ indicates a transmission speed corresponding to bandwidth distributed to the VOD program for an nth time. $T_n$ indicates a transmission time corresponding to the transmission speed $R_n$. X indicates a transmission speed after the bandwidth of the VOD program is adjusted. $T_x$ indicates a transmission time required to complete program data transmission at the transmission speed X. C indicates an inherent code rate of the transmitted program. $T_c$ indicates a time required to complete the VOD program data transmission at the inherent code rate C.

In this embodiment, according to bandwidth adjustment policy in step 120, it is possible that the bandwidth distributed to all the VOD programs is equal to the inherent code rate of the respective requested program. The policy of reducing the transmission speed of transmitting the VOD program data of the VOD may be adopted.

Bandwidth having a maximum transmission time in the VOD transmitting the VOD program data is determined, and a transmission speed of the bandwidth having the maximum transmission time is reduced. The reduced transmission speed X satisfies $X*T_x+C*(T_z-T_0) \geq C*T_x$. $T_x$ indicates transmission time required to complete the VOD program data transmission at X as the transmission speed. $T_z$ indicates time required to complete transmission of the received program data at the inherent code rate. $T_0$ indicates time consumed for playing the program corresponding to the received program data of the received program data. C indicates the inherent code rate of the requested program. Therefore, it is ensured that the user is not affected from watching the program after the transmission speed is reduced.

In step 150, the bandwidth corresponding to the VOD of the user or the already transmitted program is distributed to other VOD programs that are transmitting when a VOD stop request of the user is received or the program is already transmitted.

The bandwidth of each VOD is adjusted in step 120. When the user stops the VOD or the program is already transmitted before the bandwidth distributed to all the VODs are adjusted to make the bandwidth be the same as the inherent code rate of the respective requested program, step 150 may also be performed before step 140. When the bandwidth is being distributed to each VOD and the bandwidth is being adjusted, if the bandwidth distributed to all the VOD programs is not equal to the inherent code rate of the respective requested program, step 140 also needs not to be executed.

In the present invention, the bandwidth greater than the inherent code rate of the program is distributed to each VOD program, and the VOD program data is transmitted at a speed greater than the inherent code rate of the program, so that a transmission time is saved, a burden of a system is relieved, and a utilization ratio of the bandwidth is increased compared with a case in the prior art that the VOD program data is transmitted at a speed equal to the inherent code rate of the program. Further, the transmission speed of the bandwidth having the maximum time for transmitting the VOD program data is reduced, so that the VOD requests of more users may be satisfied without affecting the watching the program by the user.

In the present invention, the received program data may be stored in a respective storage device.

FIG. 4 is a block diagram of a resource scheduling method according to another embodiment of the present invention. In this embodiment, a processing capability of an STB can satisfy that the STB may store received program data in a storage device when program data is transmitted according to a maximum code rate of a program, that is, an inherent code rate of the program plus a speed of writing the received program data in the storage device by the STB, and may normally play the program. For example, the system has one available frequency point, and bandwidth that can be provided by the frequency point is 38 M. For ease of computation, it is assumed that each user requests the same program, an inherent code rate of the program is 3.75 M, and a playing duration of the program is 2 hours, by using the existing method, the system may transmit 10 sets of the program at the same time.

The processing capability of the STB in this embodiment satisfies a condition that, for example, when the STB has a storage device, the speed of writing the received program data in the storage device is Y, and the inherent code rate of the transmitted program is C, the speed of transmitting the VOD program data by the STB cannot be greater than the maximum code rate (Y+C) of the program.

A characteristic of a resource scheduling policy in this embodiment is that for one frequency point, the available bandwidth is distributed to the VOD program of one user to a maximum degree, and the bandwidth is distributed to other VOD programs according to the inherent code rate of the program. Firstly, the bandwidth is distributed to the VOD program of the user that first requests the program according to the bandwidth of the maximum frequency point, and when other users request the program, the bandwidth distributed to the first VOD program is reduced.

It is assumed that at 18:00, a first user requests the program. As the bandwidth of the maximum frequency point is 38 M and the inherent code rate of the program is 3.75, the system distributes the bandwidth of 3.75*10=37.5 M to the first VOD program, that is, here a total bandwidth consumed by the system is 37.5 M. For ease of computation, in this embodiment, the bandwidth is distributed to the VOD program according to an integral multiple of the inherent code rate of the program. Practically, the bandwidth may also not be distributed to the VOD program according to the integral multiple of the inherent code rate of the program, for example, the bandwidth of 38 M is distributed to the first VOD program according to the bandwidth of the maximum frequency point.

It is assumed that at 18:05, a second user requests the program. The bandwidth that can be provided by the frequency point is only 38−37.5=0.5 M, so that the bandwidth distributed to the first VOD program is reduced, the bandwidth of the first VOD program is adjusted to make the bandwidth be 3.75*9=33.75 M, and then the bandwidth of the inherent code rate of the program of 3.75*1=3.75 M is distributed to the second VOD program. Here, the total bandwidth consumed by the system is 33.75+3.75=37.5 M.

It is assumed that at 18:10, a third user requests the program. The bandwidth distributed to the first VOD program is reduced again that the bandwidth of the first VOD program is adjusted to make the bandwidth be 3.75*8=30 M. The bandwidth of the second VOD program is not changed. The bandwidth of the inherent code rate of the program of 3.75*1=3.75 M is distributed to the third VOD program. Here, the total bandwidth consumed by the system is 30+3.75+3.75=37.5 M.

Accordingly, it is assumed that every 5 minutes one user is added to request the program, so that when the third user requests the program, according to $R_1T_1+R_2T_2 \ldots +R_nT_n+XT_x \geq CT_c$, the first VOD program satisfies: 3.75*10*1/12+3.75*9*1/12+3.75*8*1/12>3.75*2, that is, the first VOD program completes program transmission in 1/12+1/12+1/12=1/4 hour, 15 minutes. Compared with the prior art, at least 105 minutes are saved.

The scheduling policy in this embodiment is simple and feasible, in which the bandwidth greater than the inherent code rate of the program is distributed to each VOD program, and the VOD program data is transmitted at the speed greater than the inherent code rate of the program, so that compared with a case in the prior art that the VOD program data is transmitted at a speed equal to the inherent code rate of the program, a transmission time is saved, a burden of a system is relieved, and a utilization ratio of the bandwidth is increased.

FIG. 5 is a block diagram of a resource scheduling method according to another embodiment of the present invention. In this embodiment, a processing capability of an STB can satisfy that the STB may store received program data in a storage device when program data is transmitted according to a maximum code rate of a program, and may normally play the program. For example, the system has one available frequency point, and bandwidth that can be provided by the frequency point is 38 M. For ease of computation, it is assumed that each user requests the same program, an inherent code rate of the program is 3.75 M, and a playing duration of the program is 2 hours, by using the existing method, the system may transmit 10 sets of the program at the same time.

A characteristic of a resource scheduling policy in this embodiment is that for one frequency point at the same, in a case that the available bandwidth allows, the bandwidth greater than the inherent code rate of respective requested program may be distributed to a plurality of VOD programs. In one mode, the bandwidth is first distributed to the VOD program according to the bandwidth preset by the STB or the bandwidth automatically acquired from the STB. When the available bandwidth distributed to the frequency point cannot be distributed according to the principle, the bandwidth is distributed to the VOD program according to the inherent code rate of the program. When the available bandwidth of the frequency point cannot be redistributed to one VOD program, that is, the available bandwidth is smaller than the inherent code rate of the requested program, the bandwidth distributed to the VOD program to which bandwidth has been distributed greater than the inherent code rate of the program is reduced.

The preset bandwidth may be the bandwidth configured when the user subscribes at the operator, or the bandwidth acquired through an automatic reporting process performed by a bi-directional STB. No matter for the configured bandwidth or the bandwidth acquired through the reporting process, the condition that the STB may store the received program data in the storage device when the VOD program data according to the inherent code rate is transmitted and at the same time may normally play the program when the VOD program data according to the inherent code rate is transmitted needs to be satisfied. The bandwidth automatically acquired from the STB is the bandwidth reported by the STB.

It is assumed that at 18:00, a first user requests the program, and every 5 minutes one more user requests the program. It is assumed that a maximum transmission bandwidth set by the STB is 15 M, and the system distributes bandwidth of $3.75*4=15$ M to a first VOD program. Here, a total bandwidth consumed by the system is 15 M.

At 18:05, a second user requests the program. It is assumed that the maximum transmission bandwidth is 15 M, and the system distributes bandwidth of $3.75*4=15$ M to a second VOD program. Here, the total bandwidth consumed by the system is $15+15=30$ M.

At 18:10, a third user requests the program. Here the available bandwidth $38-30=8$ M of the system cannot be distributed according to a maximum transmission bandwidth of the STB, so that the bandwidth of $3.75*1=3.75$ M is distributed to a third VOD program according to the inherent code rate of the program. Here, the total bandwidth consumed by the system is $15+15+3.75=33.75$ M.

At 18:15, a fourth user requests the program. Here the available bandwidth of the system is $38-33.75=4.25$ M, and the bandwidth of $3.75*1=3.75$ M is distributed to a fourth VOD program according to the inherent code rate of the program. Here, the total bandwidth consumed by the system is $15+15+3.75+3.75=37.5$ M.

At 18:20, a fifth user requests the program. Here the available bandwidth of the system is $38-37.5=0.5$ M, and the bandwidth cannot be distributed according to the inherent frequency of the program, so that the adjustment is performed. The bandwidth of the first VOD program is adjusted to make the bandwidth be $3.75*3=11.25$ M according to the inherent code rate of the program, and then the bandwidth of $3.75*1$ M is distributed to a fifth VOD program. Here, $3.75*4*1/12+3.75*4*1/12+3.75*4*1/12+3.75*4*1/12=5$ M, that is, $2/3$ of the program resource, is already transmitted for the first VOD program, and $3.75*4*1/12+3.75*4*1/12+3.75*4*1/12=3.75$ M, that is, $1/2$ of the program resource is already transmitted for the second VOD program. Apparently, transmission of the entire program can be completed before 19:00 for the first VOD program and the second VOD program.

The method in this embodiment may further includes that when the user stops the VOD program, or the program is already transmitted, the system distributes the bandwidth of the VOD program of the user or the bandwidth corresponding to the already transmitted program to other VOD programs transmitting the VOD program data, thereby dynamically scheduling the bandwidth.

FIG. 6 is a block diagram of a resource scheduling method according to another embodiment of the present invention. This embodiment is different from the afore-mentioned embodiment in that as follows. For example, when the fourth user stops requesting the program at 18:20, the system recycles the bandwidth of 3.75 M occupied by the VOD program of the fourth user, and distributes the bandwidth to other VOD programs transmitting the VOD program data, for example, to the first VOD program. Here, the bandwidth distributed to the first VOD program is $3.75*4=15$ M, so that the bandwidth is dynamically adjusted.

In this embodiment, it is only a preferred solution to distribute the bandwidth of the fourth VOD program to the first VOD program. As the time of transmitting the program for the first VOD program is the longest, and the transmission speed is the highest, if more bandwidth are distributed to the first VOD program, the first VOD program may complete the VOD program data transmission more quickly, so that the bandwidth of the first VOD program may be distributed to other VOD programs. It should be understood by persons skilled in the art that the bandwidth of the fourth VOD program may also be distributed to the second VOD program or other VOD programs transmitting the VOD program data. In the prior art, the bandwidth of the fourth VOD program is distributed to a new VOD program. Compared with the prior art, a distribution policy according to this embodiment of the present invention may increase an efficiency of transmitting the VOD program data.

FIG. 7 is a block diagram of a resource scheduling method according to another embodiment of the present invention. This embodiment is different from the afore-mentioned embodiments in that as follows. For example, if the VOD program data transmitted by the first VOD program is already transmitted at 18:20, the system recycles the bandwidth of the first VOD program, and distributes the bandwidth to other VOD programs transmitting the VOD program data, for example, the third VOD program, so that the bandwidth distributed to the third VOD program is $3.75*4=15$ M. It is the same as in the afore-mentioned embodiments that for the fifth VOD program added at 18:20, the bandwidth is distributed according to the bandwidth of the inherent code rate of the program.

Similarly, it should be understood by persons skilled in the art that the VOD program to which the bandwidth of the first VOD program is distributed is not limited in the present invention. In addition to the third VOD program, the bandwidth may be distributed to other VOD programs transmitting the VOD program data, or a newly added VOD program.

Figures 8, 9:
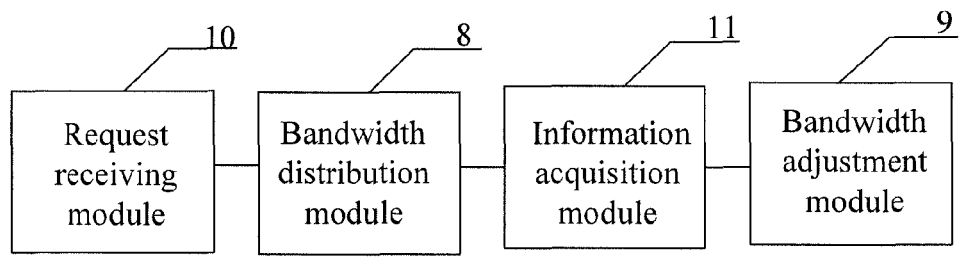
FIG. 8 is a block diagram of a resource scheduling method according to another embodiment of the present invention.
FIG. 9 is a block structural diagram of a resource scheduling apparatus according to the present invention.

FIG. 8 is a block diagram of a resource scheduling method according to another embodiment of the present invention. In this embodiment, a processing capability of an STB can satisfy that the STB may store received program data in a storage device and at the same time may normally play the program when program data is transmitted according to a maximum code rate of a program. For example, the system has one available frequency point, and bandwidth that can be provided by the frequency point is 38 M. It is assumed that an inherent code rate of the requested program is 3.75 M, and a playing duration of the program is 2 hours, by using the existing method, the system may transmit 10 sets of the program at the same time.

It is assumed every 2 s one more user requests the program. Therefore, the bandwidth is first distributed according to a maximum transmission bandwidth of the STM of 15 M.

At 18:00:00, the bandwidth distributed to a VOD program, that is, a first VOD program of a first user requesting the program is 15 M.

At 18:00:02, the bandwidth distributed to a second VOD program requesting the program is 15 M.

At 18:00:04, the bandwidth distributed to a third VOD program requesting the program is 3.75 M.

Here, a residual bandwidth of the frequency point is 38−30=8 M, and the bandwidth cannot be distributed according to the maximum transmission bandwidth of the STB of 15 M, so that the bandwidth is distributed according to the bandwidth equal to the inherent frequency of the program.

At 18:00:06, the bandwidth distributed to a fourth VOD program is 3.75 M.

At 18:00:08, the bandwidth distributed to the first VOD program is reduced to 15−3.75=11.25 M, and then the bandwidth of 3.75 M is distributed to a fifth VOD program.

Here, the residual bandwidth of the frequency point is 38−37.5=0.5 M, and the bandwidth cannot be distributed according to the bandwidth equal to the inherent frequency of the program, so that the bandwidth distributed to the first VOD program is reduced.

At 18:00:10, the bandwidth distributed to the first VOD program is reduced to 15−3.75*2=7.5 M, and then the bandwidth of 3.75 M is distributed to a sixth VOD program.

At 18:00:12, the bandwidth distributed to the first VOD program is reduced to 15−3.75*3=3.75 M, and then the bandwidth of 3.75 M is distributed to a seventh VOD program.

At 18:00:14, the bandwidth distributed to the second VOD program is reduced to 15−3.75=11.25 M, and then the bandwidth of 3.75 M is distributed to an eighth VOD program.

At 18:00:16, the bandwidth distributed to the second VOD program is reduced to 15−3.75*2=7.5 M, and then the bandwidth of 3.75 M is distributed to a ninth VOD program.

At 18:00:18, the bandwidth distributed to the second VOD program is reduced to 15−3.75*3=3.75 M, and then the bandwidth of 3.75 M is distributed to a tenth VOD program.

Here, the bandwidth of all the VOD programs is equal to the inherent code rate of the program. The bandwidth of one frequency point is 38 M, and may totally bear the VOD programs of 10 users, which may be achieved by the solution in the prior art. In the present invention, the number of the users requesting the program may be increased.

At 18:00:20, when an eleventh user requests the program, according to a formula $R_1T_1R_2T_2 \ldots +R_nT_n+XT_x \geq CT_c$, it is computed that a transmission situation of the first VOD program is that $(3.75*4)*8+(3.75*3)*2+(3.75*2)*2+3.75*8+X*T_x=3.75*60$.

$X*T_x=3.75*10$ is acquired.

According to a formula $X*T_x+C*(T_z-T_0) \geq C*T_x$. $T_z$ indicates time required for transmission of the received program data by using the inherent code rate. It is known that the VOD program data received by the first VOD is $(3.75*4)*8+(3.75*3)*2+(3.75*2)*2+3.75*8=3.75*50$, so that $T_z=50$. $T_0$ indicates time consumed for playing the program corresponding to the received program data of the received program data. For the first VOD program, the data is transported for 20 s, and the played data is 3.75*20, so that $T_0=20$. It cam be computed that $T_x \leq 40$ and $X \geq 3.75/4$. Therefore, at least the bandwidth of 3.75/4 M is distributed to the first VOD program. If the VOD program data keeps being transmitted at the speed of 3.75/4 Mbps, it is ensured that the user of the first VOD program may normally watch the program.

It is assumed that an inherent code rate of the program requested by the eleventh user is 3.75*¾ Mbps, so that the idle bandwidth of 3.75*¾ M of the first VOD program may be just distributed to the eleventh VOD program.

It is assumed that the inherent code rate of the program requested by the eleventh user is 3.75*¾ Mbps. In a case that only the bandwidth of the first VOD program is to be reduced, the bandwidth of the first VOD program needs to be reduced to 3.75/5 M, that is, X=3.75/5M, the value of X is substituted into $R_1T_1+R_2T_2 \ldots +R_nT_n+XT_x \geq CT_c$, so that it is computed that $T_x \geq 50$ s. The value of X is substituted into a formula $X*T_x+C*(T_z-T_0) \geq C*T_x$, so that it is computed that $T_x \leq 37.5$, that is tot say, after the transmission speed of the first VOD program is reduced to 3.75/5 Mbps, if the transmission is performed for another 37.5 s at the speed, the user cannot normally watch the program. Therefore, the head-end system needs to increase the transmission speed of the first VOD program after 37.5 s, that is, at 18:00:57.5, so as to ensure that the user normally watches the program. For example, at 18:00:57.5, 3.75*50+3.75/5*37.5=3.75*57.5 M of the VOD program data for the first VOD program is transmitted, and 3.75*2.5 M of the data is not transmitted. Here, the data of the second VOD program is already transmitted, so that the 3.75*2.5 M of the bandwidth of the second VOD program may be directly distributed to the first VOD program, and only 1 s is needed to complete data transmission for the first VOD program and it is ensured that the user watches the program normally.

The transmission speed of the second VOD program is reduced by using the same method, so that more users may request the program at the same time.

In the present invention, the VOD program data is transmitted by using the speed greater than or equal to the inherent code rate of the program, and the received data is stored in the storage device, so that as compared with the prior art that the VOD program data is transmitted at a speed equal to the inherent code rate of the program, a transmission time is saved, a burden of a system is relieved, and a utilization ratio of the bandwidth is increased.

FIG. 9 is a block structural diagram of a resource scheduling apparatus according to the present invention. The apparatus according to this embodiment includes a bandwidth distribution module 8 and a bandwidth adjustment module 9. The bandwidth distribution module 8 is configured to distribute bandwidth to a VOD program of the user according to a received VOD user request, where the bandwidth is greater than bandwidth that is occupied by an inherent code rate of a program respectively requested by a user and within available bandwidth of a frequency point. The bandwidth adjustment module 9 is configured to reduce, according to the received VOD user request for currently requesting the program, the bandwidth distributed to at least one VOD program to which bandwidth has been distributed when the available bandwidth of the frequency point is smaller than bandwidth that is occupied by an inherent code rate of a currently requested program, so that the available bandwidth of the frequency point is greater than or equal to the inherent code rate of the currently requested program.

The bandwidth distribution module 8 reduces the bandwidth of the VOD program according to a formula $R_1T_1+R_2T_2\ldots+R_nT_n+XT_x \geq CT_c$. $R_1$ indicates a transmission speed corresponding to bandwidth distributed to the VOD program for a first time. $T_1$ indicates transmission time corresponding to the transmission speed. $R_n$ indicates a transmission speed corresponding to bandwidth distributed to the VOD program for an nth time. $T_n$ indicates transmission time corresponding to the transmission speed $R_n$. X indicates a transmission speed after the bandwidth of the VOD program is adjusted. $T_x$ indicates transmission time required to complete program data transmission at the transmission speed X. C indicates an inherent code rate of the transmitted program. $T_c$ indicates time required to complete the VOD program data transmission at the inherent code rate C.

The bandwidth distribution module 8 according to this embodiment is further configured to distribute the bandwidth greater than or equal to the inherent code rate of the requested program to the current VOD program after the bandwidth adjustment module 9 adjusts the bandwidth. The bandwidth adjustment module 9 is further configured to reduce a transmission speed of transmitting the VOD program data for at least one VOD program when the bandwidth distributed to all the VOD programs are equal to the inherent code rate of the program. The reduced transmission speed X satisfies $X*T_x + C*(T_z-T_0) \geq C*T_x$. $T_x$ indicates transmission time required to complete the VOD program data transmission at the transmission speed X. $T_z$ indicates time required to complete transmission of the received program data at the inherent code rate. $T_0$ indicates time consumed for playing the program corresponding to the received program data of the received program data. C indicates the inherent code rate of the requested program. The bandwidth distribution module 8 according to this embodiment is further configured to distribute the bandwidth corresponding to the VOD program of the user or the already transmitted program to other VOD programs transmitting the VOD program data when a VOD stop request of the user is received or the program is already transmitted.

Furthermore, the apparatus according to this embodiment further includes a request receiving module 10 and an information acquisition module 11. The request receiving module 10 is configured to receive a distribution request for distributing the bandwidth to each VOD program. The information acquisition module 11 is configured to acquire reference information for distributing the bandwidth to each VOD program. The reference information at least includes STB processing capability information, that is, a speed of storing received program data.

Figure 10:
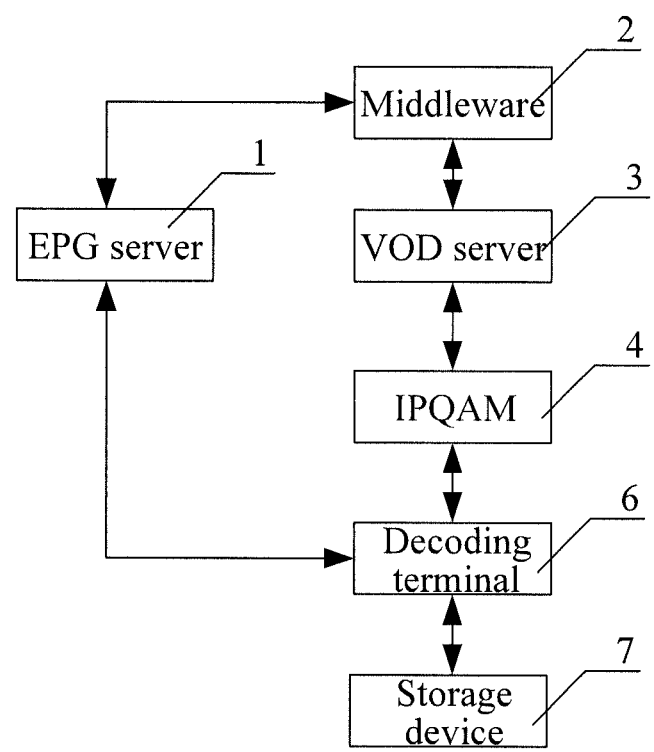
FIG. 10 is a block structural diagram of a program requesting system according to the present invention.

FIG. 10 is a block structural diagram of a program requesting system according to the present invention. The system according to this embodiment includes an Electronic Program Guide (EPG) server 1, middleware 2, a VOD server 3, an IPQAM 4, a decoding terminal 6, and a storage device 7. The EPG server 1 is configured to provide EPG information, receive information of a selected program, and send VOD information. The middleware 2 is connected to the EPG server 1, and configured to schedule a code stream corresponding to the requested program according to the received VOD information and send program description information of the program to the decoding terminal 6. The bandwidth distribution module 8 is configured to distribute bandwidth greater than bandwidth that is occupied by an inherent code rate of the requested program to a VOD program of the user within available bandwidth of a frequency point, according to a received VOD user request. The bandwidth adjustment module 9 is configured to reduce, according to the received VOD user request for currently requesting the program, the bandwidth distributed to at least one VOD program to which bandwidth has been distributed when the available bandwidth of the frequency point is smaller than the bandwidth that is occupied by an inherent code rate of a currently requested program, so that the available bandwidth of the frequency point is greater than or equal to the inherent code rate of the currently requested program. The VOD server 3 is connected to the middleware 2. The middleware 2 controls the VOD server 3 to extract and output program data corresponding to the VOD information according to the received VOD information, and outputs the program description information corresponding to the VOD information. The IPQAM 4 is connected to the VOD server 3, and multiplexes and outputs the received program data. The decoding terminal 6 is connected to the IPQAM 4 and the EPG server 1, and configured to decode and output the VOD program data according to the received program description information. The storage device 7 is connected to the decoding terminal 6, and configured to store the VOD program data received by the decoding terminal 6.

The decoding terminal according to this embodiment may also be an STB.

The middleware 2 according to this embodiment may schedule the code stream corresponding to the program by using the resource scheduling method according to the present invention. For details, please refer to the description of the embodiments of the resource scheduling method.

Figure 11:
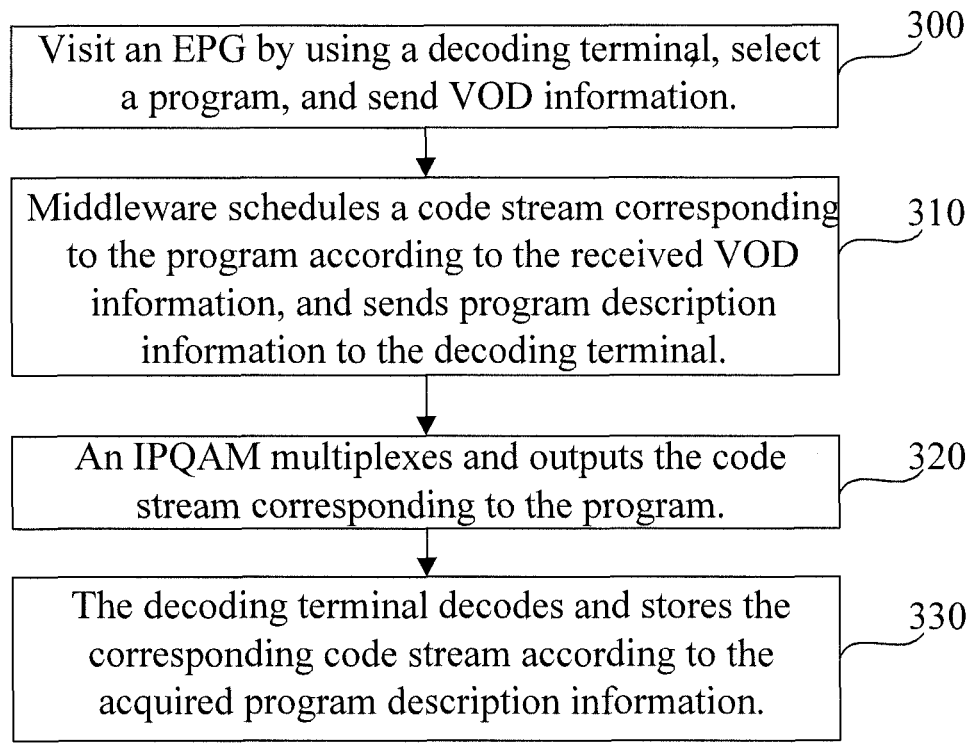
FIG. 11 is a flow chart of a program requesting method according to the present invention.

FIG. 11 is a flow chart of a program requesting method according to the present invention, which includes the following steps.

In step 300, an EPG is visited by using a decoding terminal, a program is selected, and VOD information is sent.

In step 310, middleware schedules a code stream corresponding to the program according to the received VOD information, and sends program description information to the decoding terminal.

For the details of the procedure of scheduling the code stream corresponding to the program by the middle ware according to the received VOD information in step 310, please refer to the description of the embodiments of the resource scheduling method.

In step 320, an IPQAM multiplexes and outputs the code stream corresponding to the requested program.

In step 330, the decoding terminal decodes and stores the corresponding code stream according to the acquired program description information.

For the method for scheduling the code stream corresponding to the program in step 310, please refer to the description of the resource scheduling method according to the present invention in FIG. 2 to FIG. 8.

In the program requesting method according to the present invention, the frequency point resource may be reasonably distributed according to the VOD request, so that the number of the users requesting the same program is increased, a speed of transmitting the VOD program data is also increased, a burden of a system is relieved, and a utilization ratio of the bandwidth is increased.

Figure 12:
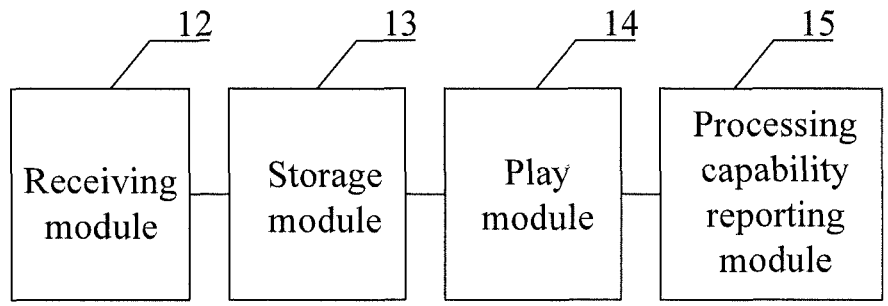
FIG. 12 is a schematic structural view of an STB according to the present invention.

FIG. 12 is a schematic structural view of an STB according to the present invention. The STB according to this embodiment includes a receiving module 12, a storage module 13, and a play module 14. The receiving module 12 is configured to receive and output program data of a program requested by a user sent at a speed greater than an inherent code rate of the program. The storage module 13 is configured to receive and store the VOD program data transmitted by using the speed greater than or equal to the inherent code rate of the program. The play module 14 is configured to play the VOD program data.

Further, the STB according to this embodiment further includes a processing capability reporting module 15, which is configured to acquire processing capability information of the STB, that is, a speed of storing received program data, and send the processing capability information.

In the STB according to this embodiment, the VOD program data of the program requested by the user sent at the speed greater than or equal to the inherent code rate of the program may be stored by disposing the storage module, and the received program data is played by disposing the play module. Therefore, the number of the users requesting the same program is increased, a burden of a system is relieved, and a utilization ratio of the bandwidth is increased.

Person of ordinary skill in the art may understand that all or part of the steps of the method according to the embodiments of the present invention may be implemented by a program instructing relevant hardware. The program may be stored in a computer readable storage medium. When the program is run, content of each implementation of the communication method based on MIP technology according to the present invention may be included. The storage medium may be a ROM/RAM, a magnetic disk, or an optical disk.

In the program requesting system, the program requesting method, and the STB according to the present invention, frequency point resources are reasonably distributed according to the received VOD request, and the received program data is stored by disposing the storage module, so that the number of the users requesting the same program is increased, the speed of transmitting the VOD program data is increased, the burden of the system is relieved, and the utilization ratio of the resource is increased.

It should be noted that the above embodiments are merely provided for elaborating the technical solutions of the present invention, but not intended to limit the present invention. Although the present invention has been described in detail with reference to the foregoing embodiments, it is apparent that person having ordinary skill in the art can make various modifications or equivalent replacements to the technical solutions of the invention without departing from the spirit and scope of the invention. Any modification, equivalent replacement, or improvement made without departing from the spirit of the present invention should fall within the scope of the present invention.

What is claimed is:

1. A resource scheduling method, comprising:
distributing, by computer hardware implementing process(es), bandwidth to a Video On Demand (VOD) program according to a received VOD user request and according to a transmission speed corresponding to bandwidth distributed to the VOD program at each time and a transmission time corresponding to the transmission speed, wherein the bandwidth is greater than a bandwidth that is occupied by an inherent code rate of the VOD program and within available bandwidth of a radio frequency point; and
reducing, by the computer hardware, according to another received VOD user request as a currently requested VOD program, bandwidth distributed to at least one VOD program to which bandwidth has been distributed, when the available bandwidth of the radio frequency point is smaller than the bandwidth that is occupied by an inherent code rate of the currently requested VOD program, so that the available bandwidth of the radio frequency point is greater than or equal to the inherent code rate of the currently requested VOD program,
wherein the reducing the bandwidth of the at least one VOD program is according to a formula $R_1T_1+R_2T_2\ldots+R_nT_n+XT_x \geq CT_c$, wherein $R_1$ indicates a transmission speed corresponding to bandwidth distributed for a first time VOD program, $T_1$ indicates a transmission time corresponding to the transmission speed, $R_n$ i indicates a transmission speed corresponding to bandwidth distributed for an nth time VOD program, $T_n$ indicates a transmission time corresponding to the transmission speed $R_n$, X indicates a transmission speed after the bandwidth of the at least one VOD program is adjusted, $T_x$ indicates transmission time required to complete the at least one VOD program transmission at the transmission speed X, C indicates an inherent code rate of the currently requested VOD program transmission, $T_c$ indicates time required to complete the currently requested VOD program transmission at the inherent code rate C of the currently requested VOD program transmission.

2. The resource scheduling method according to claim 1, further comprising:
reducing a transmission speed of at least one VOD program when the bandwidth distributed to VOD programs is adjusted to make the bandwidth be equal to the bandwidth that is occupied by an inherent code rate of a respective corresponding VOD program.

3. The resource scheduling method according to claim 2, wherein the reducing the transmission speed of at least one VOD program comprises: determining bandwidth that costs a maximum time for transmitting the VOD program data, and reducing a transmission speed of the bandwidth that costs the maximum time for transmitting the VOD program data.

4. The resource scheduling method according to claim 1, wherein the adjusted transmission speed X satisfies $X*T_x+C*(T_z-T_0) \geq C*T_x$, $T_x$ indicates transmission time required to complete the at least one VOD program transmission at the transmission speed X, $T_z$ indicates time required to complete receiving the transmitted at least one VOD program at the inherent code rate of the at least one VOD program, $T_0$ is time consumed for playing the at least one VOD program corresponding to the received at least one VOD program, and C is the inherent code rate of the currently requested VOD program.

5. The resource scheduling method according to claim 1, further comprising: distributing the bandwidth to other VOD programs that are transmitting, when the VOD stop request of the user is received or the transmission of the program is completed, wherein the bandwidth corresponds to the VOD program indicated in a VOD stop request of the user or the program whose transmission is completed.

6. The resource scheduling method according to claim 1, further comprising: acquiring, by the computer hardware, reference information for distributing the bandwidth to VOD programs, wherein the reference information at least includes a speed of storing received program data by a Set Top Box STB.

7. A resource scheduling apparatus, comprising:
a non-transitory computer readable storage medium that stores program(s); and
computer hardware configured to implement, including configured by the program(s) to implement:
a bandwidth distribution module to distribute bandwidth to a Video On Demand (VOD) program according to a received VOD user request and according to a transmission speed corresponding to bandwidth distributed to the VOD program at each time and a transmission time corresponding to the transmission speed, wherein the bandwidth is greater than a bandwidth that is occupied by an inherent code rate of the VOD program and within available bandwidth of a radio frequency point; and a bandwidth adjustment module to reduce, according to another received VOD user request as currently requested VOD program, bandwidth distributed to at least one VOD program to which bandwidth has been distributed when the available bandwidth of the radio frequency point is smaller than the bandwidth that is occupied by an inherent code rate of the currently requested VOD program, so that the available bandwidth of the radio frequency point is greater than or equal to the inherent code rate of the currently requested VOD program, wherein the reducing the bandwidth of the at least one VOD program is according to the formula $R_1T_1+R_2T_2\ldots+R_nT_n+XT_x \geq CT_c$, wherein $R_1$ indicates a transmission speed corresponding to bandwidth distributed for a first time VOD program, $T_1$ indicates a transmission time corresponding to the transmission speed, $R_n$ indicates a transmission speed corresponding to bandwidth distributed for an nth time VOD program, $T_n$ indicates a transmission time corresponding to the transmission speed $R_n$, X indicates a transmission speed after the bandwidth of the at least one VOD program is adjusted, $T_x$ indicates transmission time required to complete the at least one VOD program transmission at the transmission speed X, C indicates an inherent code rate of the currently requested VOD program transmission, $T_c$ indicates time required to complete the currently requested VOD program transmission at the inherent code rate C of the currently requested VOD program transmission.

8. The resource scheduling apparatus according to claim 7, wherein the bandwidth adjustment module is further configured to reduce a transmission speed of at least one VOD program when the bandwidth distributed to VOD programs is adjusted to make the bandwidth be equal to the bandwidth that is occupied by an inherent code rate of a respective corresponding VOD program.

9. The resource scheduling apparatus according to claim 7, wherein the transmission speed X adjusted by the bandwidth adjustment module satisfies $X*T_x+C*(T_z-T_0) \geq C*T_x$, $T_x$ indicates transmission time required to complete the at least one VOD program transmission at the transmission speed X, $T_z$ indicates time required to complete receiving the transmitted at least one VOD program at the inherent code rate of the at least one VOD program, $T_0$ is time consumed for playing the at least one VOD program corresponding to the received at least one VOD program, and C is the inherent code rate of the currently requested VOD program.

10. The resource scheduling apparatus according to claim 7, wherein the bandwidth distribution module is configured to distribute the bandwidth corresponding to the VOD program or the already transmitted program to other VOD programs transmitting the VOD program data when a VOD stop request of the user is received or the program is already transmitted.

11. The resource scheduling apparatus according to claim 7, wherein the computer hardware is further configured to implement a request receiving module to receive a distribution request for distributing the bandwidth to VOD programs and send the distribution request to the bandwidth distribution module.

12. The resource scheduling apparatus according to claim 7, wherein the computer hardware is further configured to implement an information acquisition module to acquire reference information for distributing the bandwidth to each VOD program, wherein the reference information at least comprises a speed of storing received program data.

13. A program requesting method, comprising:
visiting an Electronic Program Guide (EPG) by using a decoding terminal, selecting a program, and sending Video On Demand (VOD) information;
scheduling, by middleware process(es) implemented by computer hardware, a code stream corresponding to the program according to the received VOD information, and sending program description information to the decoding terminal,
wherein the scheduling comprises:
distributing bandwidth to a Video On Demand (VOD) program according to a received VOD user request and according to a transmission speed corresponding to bandwidth distributed to the VOD program at each time and a transmission time corresponding to the transmission speed, wherein the bandwidth is greater than a bandwidth that is occupied by an inherent code rate of the VOD program and within available bandwidth of a radio frequency point; and
reducing, according to another received VOD user request as a currently requested VOD program, bandwidth distributed to at least one VOD program to which bandwidth has been distributed, when the available bandwidth of the radio frequency point is smaller than the bandwidth that is occupied by an inherent code rate of the currently requested VOD program, so that the available bandwidth of the radio frequency point is greater than or equal to the inherent code rate of the currently requested VOD program;
multiplexing and outputting, by computer hardware implementing process(es) of an Internet Protocol (IP) Quadrature Amplitude Modulator (IPQAM), the code stream corresponding to the requested program; and
decoding and storing, by the decoding terminal, the code stream corresponding to the program, according to the acquired program description information,
wherein the reducing the bandwidth of the at least one VOD program is according to a formula $R_1T_1+R_2T_2\ldots+R_nT_n+XT_x \geq CT_c$, wherein $R_1$ indicates a transmission speed corresponding to bandwidth distributed for a first time VOD program, $T_1$ indicates a transmission time corresponding to the transmission speed, $R_n$ indicates a transmission speed corresponding to bandwidth distributed for an nth time VOD program, $T_n$ indicates a transmission time corresponding to the transmission speed $R_n$, X indicates a transmission speed after the bandwidth of the at least one VOD program is adjusted, $T_x$ indicates transmission time required to complete the at least one VOD program transmission at the transmission speed X, C indicates an inherent code rate of the currently requested VOD program transmission, $T_c$ indicates time required to complete the currently requested VOD program transmission at the inherent code rate C of the currently requested VOD program transmission.

14. The program requesting method according to claim 13, further comprising:
reducing a transmission speed of at least one VOD program when the bandwidth distributed to VOD programs is adjusted to make the bandwidth be equal to an inherent code rate of a respective corresponding program.

15. The program requesting method according to claim 14, the reducing the transmission speed of at least one VOD program comprises: determining bandwidth that cost a maximum time for transmitting the VOD program data, and reducing a transmission speed of the bandwidth that cost the maximum time for transmitting the VOD program data.

16. The program requesting method according to claim 13, wherein the adjusted transmission speed X satisfies $X*T_x + C*(T_z-T_0) \geq C*T_x$, $T_x$ indicates transmission time required to complete the at least one VOD program data transmission at the transmission speed X, $T_z$ indicates time required to complete receiving the transmitted at least one VOD program at the inherent code rate of the at least one VOD program, $T_0$ is time consumed for playing the at least one VOD program corresponding to the received at least one VOD program, and C is the inherent code rate of the currently requested VOD program.

17. The program requesting method according to claim 13, further comprising: distributing the bandwidth to other VOD programs that are transmitting, when the VOD stop request of the user is received or the transmission of the program is completed, wherein the bandwidth corresponds to the VOD program indicated in a VOD stop request of the user or the program whose transmission is completed.

18. A program demanding system, comprising:
an Electronic Program Guide (EPG) server, configured to provide EPG information, receive information of a selected program, and send Video On Demand (VOD) information;
a middleware implemented by computer hardware, including program(s) instructing the computer hardware, and connected to the EPG server,
the middleware configured to schedule a code stream corresponding to the program according to the received VOD information, and send program description information of the program to a decoding terminal, and to implement:
a bandwidth distribution module to distribute bandwidth to a Video On Demand (VOD) program according to a received VOD user request, wherein the bandwidth is greater than a bandwidth that is occupied by an inherent code rate of the VOD program and within available bandwidth of a radio frequency point; and
a bandwidth adjustment module to reduce, according to another received VOD user request as currently requested VOD program, bandwidth distributed to at least one VOD program to which bandwidth has been distributed when the available bandwidth of the radio frequency point is smaller than the bandwidth that is occupied by an inherent code rate of the currently requested VOD program, so that the available bandwidth of the radio frequency point is greater than or equal to the inherent code rate of the currently requested VOD program,
wherein the reducing the bandwidth of the at least one VOD program is according to a formula $R_1T_1+R_2T_2 \ldots +R_nT_n+XT_x \geq CT_c$, wherein $R_1$ indicates a transmission speed corresponding to bandwidth distributed for a first time VOD program, $T_1$ indicates a transmission time corresponding to the transmission speed, $R_n$ indicates a transmission speed corresponding to bandwidth distributed for an nth time VOD program, $T_n$ indicates a transmission time corresponding to the transmission speed $R_n$, X indicates a transmission speed after the bandwidth of the at least one VOD program is adjusted, $T_x$ indicates transmission time required to complete the at least one VOD program transmission at the transmission speed X, C indicates an inherent code rate of the currently requested VOD program transmission, $T_c$ indicates time required to complete the currently requested VOD program transmission at the inherent code rate C of the currently requested VOD program transmission;

a VOD server, connected to the middleware, the middleware controls the VOD server to extract and output program data corresponding to the VOD information according to the received VOD information, and outputs the program description information corresponding to the VOD information; and
an Internet Protocol Quadrature Amplitude Modulator (IP-QAM) implemented by computer hardware, including program(s) instructing the computer hardware, and connected to the VOD server, configured to multiplexes and outputs the received program data.

19. The program demanding system according to claim 18, further comprising:
a decoding terminal, connected to the IPQAM and the EPG server, and configured to decode and output the VOD program data according to the received program description information; and
a storage device, connected to the decoding terminal, and configured to store the VOD program data received by the decoding terminal.

20. The program demanding system according to claim 18, wherein the middleware comprises the bandwidth distribution module and the bandwidth adjustment module.

21. An Set Top Box (STB), comprising:
a non-transitory computer readable storage medium that stores program(s); and
computer hardware configured to implement, including configured by the program(s) to implement:
a receiving module to receive and output program data of a Video On Demand (VOD) program requested by a user of the STB and sent for the STB at a speed greater than or equal to an inherent code rate of the VOD program,
wherein bandwidth occupied by the output program data is within available bandwidth of a radio frequency point and is distributed according to a transmission speed corresponding to bandwidth distributed to the VOD program at each time and a transmission time corresponding to the transmission speed, and
wherein the bandwidth distributed to the VOD program requested by the user is reduced according to another VOD program request as other currently requested VOD program, when the available bandwidth of the radio frequency point is smaller than the bandwidth that is occupied by an inherent code rate of the other currently requested VOD program, so that the available bandwidth of the radio frequency point is greater than or equal to the inherent code rate of the other currently other requested VOD program, the reducing of the bandwidth of the VOD program is according to a formula $R_1T_1+R_2T_2 \ldots +R_nT_n+XT_x \geq CT_c$, wherein $R_1$ indicates a transmission speed corresponding to bandwidth distributed for a first time VOD program, $T_1$ indicates a transmission time corresponding to the transmission speed, $R_n$ indicates a transmission speed corresponding to bandwidth distributed for an nth time VOD program, $T_n$ indicates a transmission time corresponding to the transmission speed $R_n$, X indicates a transmission speed after the bandwidth of the VOD program is adjusted, $T_x$ indicates transmission time required to complete the VOD program transmission at the transmission speed X, C indicates an inherent code rate of the other currently requested VOD program transmission, $T_c$ indicates time required to complete the other currently requested VOD program transmission at the inherent code rate C of the other currently requested VOD program transmission;

a storage module to receive and store the VOD program data transmitted by using the speed greater than or equal to the inherent code rate of the program; and a play module to play the VOD program data.

22. The STB according to claim 21, wherein the computer hardware is further configured to implement a processing capability reporting module to acquire processing capability information of the STB and send out the processing capability information, wherein the processing capability information of the STB includes a speed of storing received program data.

* * * * *